United States Patent [19]

Koyamada et al.

[11] Patent Number: 5,764,872
[45] Date of Patent: Jun. 9, 1998

[54] METHOD AND SYSTEM FOR DISPLAYING VECTOR DATA AS STREAM LINES IN A SPACE REPRESENTED BY TETRAHEDRAL CELLS

[75] Inventors: Koji Koyamada, Hadano; Takayuki Ito, Sagamihara, both of Japan

[73] Assignee: International Business Machines Corporation, Armonk, N.Y.

[21] Appl. No.: 495,766

[22] Filed: Jun. 27, 1995

[30] Foreign Application Priority Data

Jun. 28, 1994 [JP] Japan .................. 6-146018

[51] Int. Cl.$^6$ ............................. G06T 17/00
[52] U.S. Cl. .................................. 395/140
[58] Field of Search ............... 395/140, 141, 395/133, 138, 142, 143, 118, 119, 120, 124, 125, 127, 129, 949, 952, 953, 967; 364/420

[56] References Cited

U.S. PATENT DOCUMENTS 5,459,820 10/1995 Schroeder .................. 395/141 X

OTHER PUBLICATIONS

S. Choudhury & R. A. Nicolaides, Discretization of Incompressible Vorticity-Velocity Equations on Triangular Meshes, International Journal for Numerical Methods in Fluids, vol. 11, 823–833, 1990 (XP 000579344) (by John Wiley & Sons, Ltd).

R. M. Ford, R. N. Strikland & B. A. Thomas, Image Models for 2–D Flow Visualization and Compression, 243a Graphical Models and Image Processing, 56 (1994) Jan., No. 1, Orlando, FL. vol. 56, No. 1, pp. 75–93, 1994, (1994 Academic Press Inc. ).

J. Helman & L. Hesselink, Representation and Display of Vecotr Field Topology in Fluid Flow Data Sets, 8153 IEEE Computer, No. 8, pp. 27–36, Aug. 22, 1989.

C. Levit, T. Lasinki, A Tool for Visualizing the Topology of Three-Dimensional Vector Fields, A Globus, Computer Sciences Corp., NASA Ames Research Center IEEE Visualization '91, pp. 33–40, 1991.

Helman and Hesselink, Visualizing Vector Field Topology in Fluid Flows, IEEE Computer Graphics an Applicaitons, vol. 11, No. 3, pp. 33–46.

*Primary Examiner*—Almis R. Jankus
*Attorney, Agent, or Firm*—Khanh Q. Tran

[57] ABSTRACT

A method and apparatus for displaying stream lines in a space are disclosed. First, the space is divided into a plurality of tetrahedral cells. Position data of each vertex of the tetrahedral cells and vector data at each position are collected. A critical point for each tetrahedral cell is then computed. The critical point is within the tetrahedral cell and for which the vector data becomes zero. Using the collected position and vector data, a Jacobian matrix J is calculated when such a critical point is found, and eigenvalues of the Jacobian matrix J are also calculated. Next, the starting point of a stream line within a tetrahedral cell is calculated for each of the eigenvalues by moving a microscopic distance from the critical point. Finally, a stream line is calculated from the starting point, and the stream line is displayed.

18 Claims, 4 Drawing Sheets

METHOD AND SYSTEM FOR DISPLAYING VECTOR DATA AS STREAM LINES IN A SPACE REPRESENTED BY TETRAHEDRAL CELLS

FIELD OF THE INVENTION

The present invention generally relates to the field of computer graphics. More particularly, the invention relates to a method for displaying a stream line in a three-dimensional space.

BACKGROUND OF THE INVENTION

It is possible with the use of computer graphics to display the scattering vector data in a three-dimensional space but, in many cases, it is difficult for a person looking at the display to understand what is displayed. For example, there are some cases in which, when arrows representative of vector data are displayed in a three-dimensional space, the direction of the arrows becomes vague and the arrows overlap each other in the direction of depth. For this reason, visualization is sometimes easier when done through the display of stream lines. A stream line is intended to be a curved line in which a tangential line at each point is parallel to a velocity field at each such point.

In displaying a stream line, it is important to find an appropriate starting point for the stream line. Since a stream line is a locus such that an imaginary object whose weight and size are zero travels when released at a certain starting point, a different starting point will result in a different stream line to be drawn. Usually, when a person attempts to display a stream line, she is not merely interested in the flow of a fluid, but whether a particular phenomenon occurs somewhere in the region observed, for example, a vortex. Therefore, if an inappropriate starting point is selected, the imaginary object travels unrelated to the vortex and valid data cannot be obtained. The starting point can be interactively selected on a graphic display. However, since there is usually an infinite number of selectable points, it is difficult to find an appropriate starting point quickly unless the distribution of vector data is known in advance.

The starting point can be selected effectively by setting it in the vicinity of a near critical point. A critical point is one whose vector data becomes zero. An example of such critical points are those defined on targeted right-cross cells discussed by Globus et al in the paper titled "A Tool for Visualizing the Topology of Three-Dimensional Vector Fields", IEEE Visualization '91, pp. 33–40, 1991). In this method, a velocity field in a cell is expressed in terms of eight velocity vectors defined at cell points and a tri-linear interpolation. Such a velocity field is represented by Equations (1) and (2).

Equation (1):

$$\vec{X} = \sum_{k=0}^{7} N_k \vec{X_k}$$

where $N_k = \frac{1}{8} * (1 + x_k \cdot x) * (1 + y_k \cdot y) * (1 + z_k \cdot z)$.

Equation (2):

$$\vec{V} = \sum_{k=0}^{7} N_k \vec{V_k}$$

Equation (2) expresses the cubic shown in FIG. 7 and is an equation by which a velocity V(u, v, w) is calculated at an arbitrary point X(x, y, z). In Equation (1), where k=0 to 7, $X_k(x_k, y_k, z_k)$ is expressed as follows:

$X_0=(-1, -1, -1)$,
$X_1=(1, -1, -1)$,
$X_2=(1, 1, -1)$,
$X_3=(-1, 1, -1)$,
$X_4=(-1, -1, 1)$,
$X_5=(1, -1, 1)$,
$X_6=(1, 1, 1)$, and
$X_7=(-1, 1, 1)$ where $V_k$ represents the speed at $X_k$.

From Equations (1) and (2), it is seen that a third-degree equation occurs with certainty. Since nonlinear simultaneous equations must be solved in this case, the solution for them is not readily obtainable. Globus et al attempts to obtain a solution for these equations by means of a Newton-Raphson method, but this approach is only an approximation. One of the problems associated the method by Globus et al is that in some cases, the solution to the equations does not converge and thus cannot be obtained.

In addition, the method using right-cross cells has another drawback in that a conventional finite-element method analysis can not be applied to collect data, unlike a method using tetrahedral cells. Instead, data for the right-cross cells must be collected.

SUMMARY OF THE INVENTION

It is, accordingly, an object of the present invention to overcome the above-described drawbacks and obtain the starting point of a stream line simply by using the result of a conventional finite-element method analysis.

Another object of the present invention is to obtain a critical point without solving nonlinear simultaneous equations and to obtain the starting point of a stream line by using the near critical point.

A further object of the present invention is to obtain a Jacobian matrix J simply and obtain the starting point of a stream line based on the eigenvalues and eigenvectors of the Jacobian matrix J.

The present invention achieves the objects stated above by providing a method for drawing vector data as stream lines in a space on the display of a computer system. The method includes the steps of: (a) collecting position data and vector data at the position of each of vertexes of each of the tetrahedral cells dividing the space; (b) calculating a critical point which is in the tetrahedral cell, wherein the vector data is zero at the critical point, by using the collected position data and vector data; (c) calculating a Jacobian matrix J for the critical point; (d) calculating eigenvalues of the calculated Jacobian matrix; (e) calculating a starting point of a stream line for each of the eigenvalues, where the starting point is in the tetrahedral cell and is moved at a microscopic distance from the critical point; (f) calculating the stream line from the starting point; and (g) displaying the stream line on the display of the computer system. Accordingly, the present invention provides a method for easily obtaining and displaying the starting point of a stream line.

In a preferred embodiment of the invention, the step of collecting the position and vector data may be performed using a conventional finite-element method analysis. As a result, it is not necessary to collect new data for each of the right-cross cells as in the case of the prior art method.

In another preferred embodiment of the invention, the step of calculating a critical point is simplified by using volume coordinates transformed from the position and vector data.

In yet another preferred embodiment of the present invention, the step of calculating the Jacobian matrix J is performed using coordinate transformation matrices $M_x$ and $M_v$ to transform the position data and vector data, respectively, into volume coordinates. Consequently, the calculation of the Jacobian matrix J is simplified and can be performed at high speed on a computer system, as compared to the prior art.

In yet another embodiment of the present invention, the step of displaying a stream line is performed only for the stream line calculated from a particular starting point. Such a starting point is computed from a predetermined value for one of the eigenvalues. In addition, the predetermined value of the eigenvalue may be a complex number. The state of a space to be displayed can be shown clearly by displaying only the desired phenomenon. In the case where the eigenvalue is a complex number, the stream line will be displayed as a vortex.

Further, the step of displaying a stream line may include selecting a desired point and displaying a stream line from the desired point. Therefore, random display of the stream line is possible as required by the user.

DESCRIPTION OF THE PREFERRED EMBODIMENT

Figure 1:
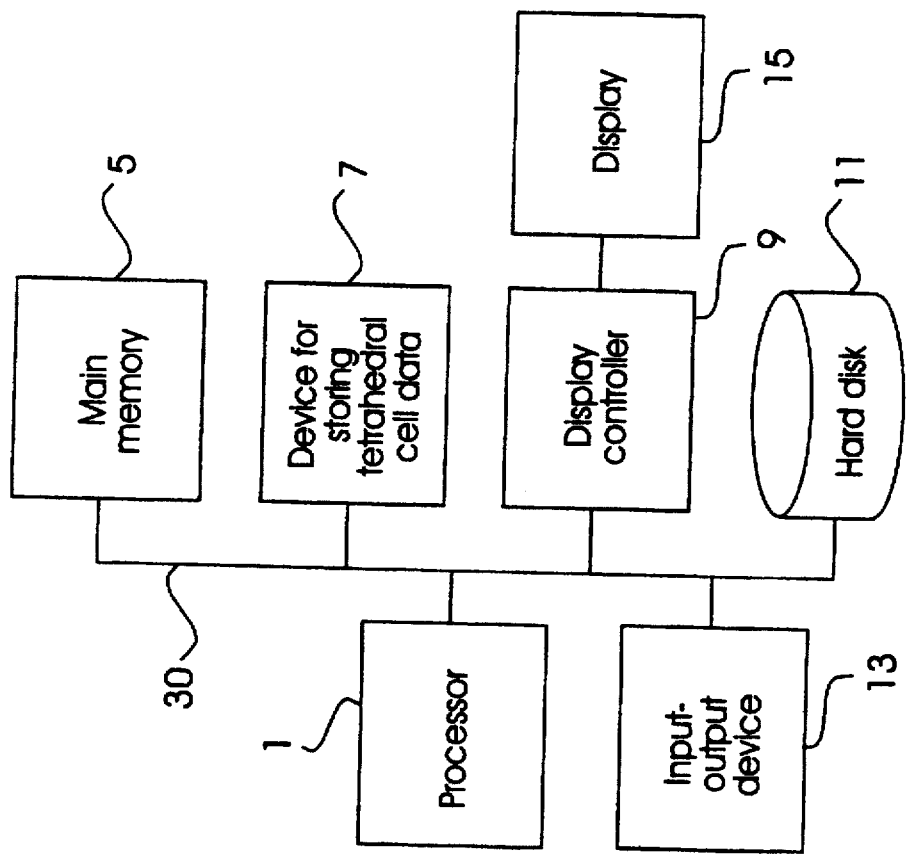
FIG. 1 is a block diagram of the structure of a computer system used in the present invention.

FIG. 1 schematically shows a computer system of the present invention. In the present invention, position data representing the positions of the vertexes of tetrahedral cells and velocity data representing the velocity of a fluid at those positions are stored in a data storage device 7. Using the position and velocity data retrieved from the storage device 7, a processor 1 performs the calculation in accordance with a control program stored in main memory 5. It is to be noted that the storage device 7 for storing tetrahedral cell data may form a part of main memory 5 of the computer system. Based on the result of the calculation performed by the processor 1, a stream line is calculated and displayed on a display 15 which is part of the computer system. An input-output device 13 may comprise a mouse, a keyboard, a printer, or any similar device that can be used to specify a position on the display 15 or a position on the printer paper where the stream line is to be displayed. When the stream line is displayed as described above, a point specified by the input-output device 13 may be displayed as a starting point of the stream line. A hard disk 11 is one normally used to store programs to be loaded into main memory 5 and data to be stored in the device for storing tetrahedral cell 7.

Figure 2:
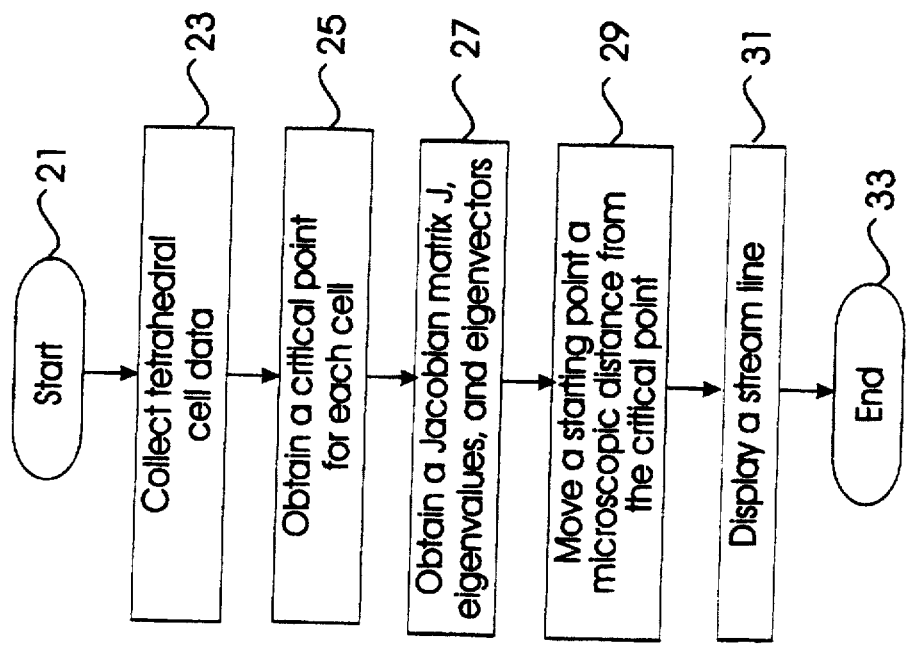
FIG. 2 is a high level flowchart of the method of the present invention.

FIG. 2 is a schematic flowchart for the method of the present invention. In step 23, tetrahedral cell data is first collected. The tetrahedral cell data includes position data for the vertexes of each tetrahedral cell and velocity data at those positions. In step 25, a critical point is calculated from the position and velocity data for each tetrahedral cell. A point whose velocity is zero is not always present in the tetrahedral cell. In step 27, a Jacobian matrix J is calculated when a critical point is found. The eigenvalues and the eigenvectors of the Jacobian matrix J are then calculated. This calculation is merely a matrix operation. Since the velocity is zero at the critical point, a stream line cannot be drawn from the critical point. Hence, in step 29, a point moved a microscopic distance from the critical point is regarded as the starting point. In step 31, the stream line is calculated from this starting point and displayed on a display.

The operation will hereinafter be described in detail with reference to FIG. 2.

First, data for the tetrahedral cells is collected. Such data may be obtained by a conventional finite element method analysis, therefore, will not be described any further.

Figure 3:
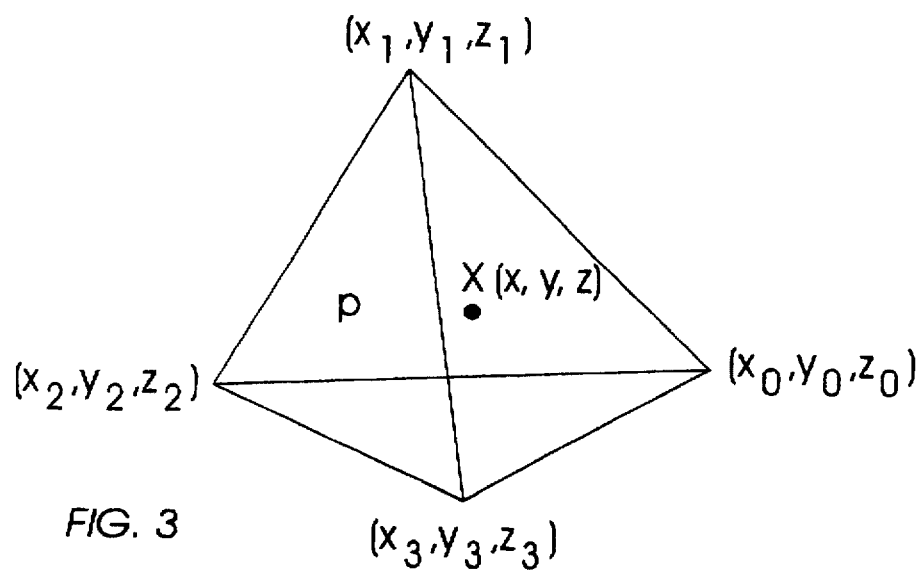
FIG. 3 shows an example of a typical tetrahedral cell.
Figure 4:
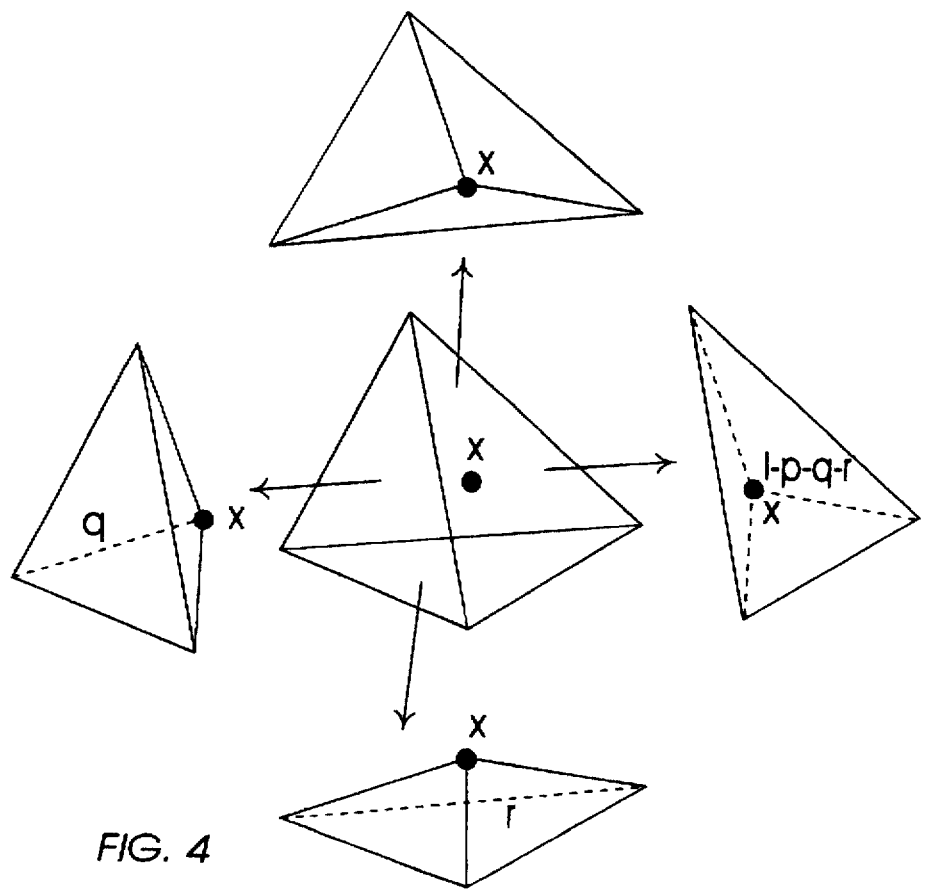
FIG. 4 illustrates an example of how global coordinates are transformed into volume coordinates by dividing a tetrahedral cell into four smaller tetrahedral cells.

Next, the critical point in each tetrahedral cell is obtained. Referring now to a typical tetrahedral cell illustrated in FIG. 3, each vertex and an arbitrary point X within the tetrahedral cell are represented by the global coordinates XYZ. However, it becomes generally complicated when the global coordinates are used to represent a point inside of the tetrahedral cell. Therefore, the tetrahedral cell is divided into four parts as shown in FIG. 4, each part being a smaller tetrahedral cell. Assuming that the volume of the whole of the tetrahedral cell is equal to 1, the four smaller tetrahedral cells would have volumes of p, q, r, and 1−p−q−r, respectively. If the point X is moved, the volume of the respective smaller tetrahedral cells will be changed by the movement of the point X. Thus, the volume coordinates are useful for representing the point X within the large tetrahedral cell. Mathematically, the transformation of the global coordinate XYZ system into the volume coordinates is performed as follows:

$$\vec{X} = \begin{pmatrix} x \\ y \\ z \end{pmatrix}$$

$$= p \times \begin{pmatrix} x_0 \\ y_0 \\ z_0 \end{pmatrix} + q \times \begin{pmatrix} x_1 \\ y_1 \\ z_1 \end{pmatrix} + r \times \begin{pmatrix} x_2 \\ y_2 \\ z_2 \end{pmatrix} + (1-p-q-r) \times \begin{pmatrix} x_3 \\ y_3 \\ z_3 \end{pmatrix}$$

Therefore, Equation (3) is obtained:

Equation (3):

$$\begin{pmatrix} x-x_3 \\ y-y_3 \\ z-z_3 \end{pmatrix} = \begin{bmatrix} x_0-x_3 & x_1-x_3 & x_2-x_3 \\ y_0-y_3 & y_1-y_3 & y_2-y_3 \\ z_0-z_3 & z_1-z_3 & z_2-z_3 \end{bmatrix} \times \begin{pmatrix} p \\ q \\ r \end{pmatrix}$$

where the coordinate transformation matrix is $$\begin{bmatrix} x_0-x_3 & x_1-x_3 & x_2-x_3 \\ y_0-y_3 & y_1-y_3 & y_2-y_3 \\ z_0-z_3 & z_1-z_3 & z_2-z_3 \end{bmatrix}$$

designated as $M_x$. Thus, a vertex i in the 3-dimension space is represented by the vertex coordinates $x_i$, $y_i$, and $z_i$.

Similarly, the velocity vectors are expressed by Equation (4) as follows:

Equation (4):

$$\begin{pmatrix} u - u_3 \\ v - v_3 \\ w - w_3 \end{pmatrix} = \begin{bmatrix} u_0 - u_3 & u_1 - u_3 & u_2 - u_3 \\ v_0 - v_3 & v_1 - v_3 & v_2 - v_3 \\ w_0 - w_3 & w_1 - w_3 & w_2 - w_3 \end{bmatrix} \times \begin{pmatrix} p \\ q \\ r \end{pmatrix}$$

where the coordinate transformation matrix is $$\begin{bmatrix} u_0 - u_3 & u_1 - u_3 & u_2 - u_3 \\ v_0 - v_3 & v_1 - v_3 & v_2 - v_3 \\ w_0 - w_3 & w_1 - w_3 & w_2 - w_3 \end{bmatrix}$$

designated as $M_v$. Thus, the vector data of a vertex i is represented by $u_i$, $v_i$, and $w_i$.

A matrix $M_v$ is calculated to check whether the critical point is found in the tetrahedral cell. If the value of the matrix is zero, the critical point will not be found, and calculation thereafter becomes unnecessary. If the value is not zero, then the values of u, v, and w of Equation (4) are set to zero to obtain a point in the tetrahedral cell whose velocity is zero. Equation (5) is then obtained as follows:

Equation (5):

$$\begin{pmatrix} p \\ q \\ r \end{pmatrix} = M_v^{-1} \times \begin{pmatrix} -u_3 \\ -v_3 \\ -w_3 \end{pmatrix}$$

The point whose velocity is zero is obtained by solving Equation (5). However, if the point obtained is outside the tetrahedral cell, the solution to the equation is invalid. In order to obtain a critical point inside the tetrahedral cell, p, q, r, and (1−p−q−r) are set to a value between 0 and 1, inclusive. The coordinates of the critical point can then be calculated from Equation (5).

Referring to the flowchart of FIG. 2, in step 27 of the method, the Jacobian matrix J is next calculated. A general equation of the Jacobian matrix J is as follows:

Equation (6):

$$J = \begin{bmatrix} \frac{\delta u}{\delta x} & \frac{\delta u}{\delta y} & \frac{\delta u}{\delta z} \\ \frac{\delta v}{\delta x} & \frac{\delta v}{\delta y} & \frac{\delta v}{\delta z} \\ \frac{\delta w}{\delta x} & \frac{\delta w}{\delta y} & \frac{\delta w}{\delta z} \end{bmatrix}$$

This equation is transformed as follows, resulting in Equation (7):

Equation (7):

$$J = \begin{bmatrix} \frac{\delta u}{\delta x} & \frac{\delta u}{\delta y} & \frac{\delta u}{\delta z} \\ \frac{\delta v}{\delta x} & \frac{\delta v}{\delta y} & \frac{\delta v}{\delta z} \\ \frac{\delta w}{\delta x} & \frac{\delta w}{\delta y} & \frac{\delta w}{\delta z} \end{bmatrix} =$$

-continued $$\begin{bmatrix} \frac{\delta p}{\delta x} & \frac{\delta q}{\delta x} & \frac{\delta r}{\delta x} \\ \frac{\delta p}{\delta y} & \frac{\delta q}{\delta y} & \frac{\delta r}{\delta y} \\ \frac{\delta p}{\delta z} & \frac{\delta q}{\delta z} & \frac{\delta r}{\delta z} \end{bmatrix} \times \begin{bmatrix} \frac{\delta u}{\delta p} & \frac{\delta v}{\delta p} & \frac{\delta w}{\delta p} \\ \frac{\delta u}{\delta q} & \frac{\delta v}{\delta q} & \frac{\delta w}{\delta q} \\ \frac{\delta u}{\delta r} & \frac{\delta v}{\delta r} & \frac{\delta w}{\delta r} \end{bmatrix}$$

In the case where the critical point is found in the tetrahedral cell and does not degenerate, the transformation matrix $M_x$ described above is modified as follows:

Equation (8):

$$\begin{bmatrix} \frac{\delta p}{\delta x} & \frac{\delta p}{\delta y} & \frac{\delta p}{\delta z} \\ \frac{\delta q}{\delta x} & \frac{\delta q}{\delta y} & \frac{\delta q}{\delta z} \\ \frac{\delta r}{\delta x} & \frac{\delta r}{\delta y} & \frac{\delta r}{\delta z} \end{bmatrix} = M_x^{-1}$$

This equation is obtained from Equation (3) by partially differentiating it with respect to x, y, and z. Similarly, the transformation matrix $M_v$ is obtained by partially differentiating Equation (4) with respect to u, v, and w, and modifying the differentiated Equation (4). The transformation matrix $M_v$ is shown in Equation (9).

Equation (9):

$$\begin{bmatrix} \frac{\delta u}{\delta p} & \frac{\delta v}{\delta p} & \frac{\delta w}{\delta p} \\ \frac{\delta u}{\delta q} & \frac{\delta v}{\delta q} & \frac{\delta w}{\delta q} \\ \frac{\delta u}{\delta r} & \frac{\delta v}{\delta r} & \frac{\delta w}{\delta r} \end{bmatrix} = M_v$$

Using Equations (8) and (9), the Jacobian matrix J is then represented as follows:

$$J \supset M_x^{-t} \times M_v^{t}$$  Equation (10):

It is to be noted that $A^t$ represents a transposed matrix of the matrix A, and $A^{-1}$ represents an inverse matrix of the matrix A. Thus, under the method of the present invention, the Jacobian matrix J can easily be obtained from the modified and differentiated coordinate transformation matrices $M_x$ and $M_v$. In the prior art, the Jacobian matrix J had to be obtained one at a time because u, v, and w were functions of x, y, and z. However, the present invention simplifies the calculation of the Jacobian matrix J by using volume coordinates according to the method described above.

In addition to calculating the Jacobian matrix J, the method step 27 of the present invention computes the eigenvalues and eigenvectors of the matrix J, as illustrated by flowchart of FIG. 2. Since the method for obtaining the eigenvalues and eigenvectors of a matrix is well known in the prior art, it will not be described in the present disclosure.

Figure 5:
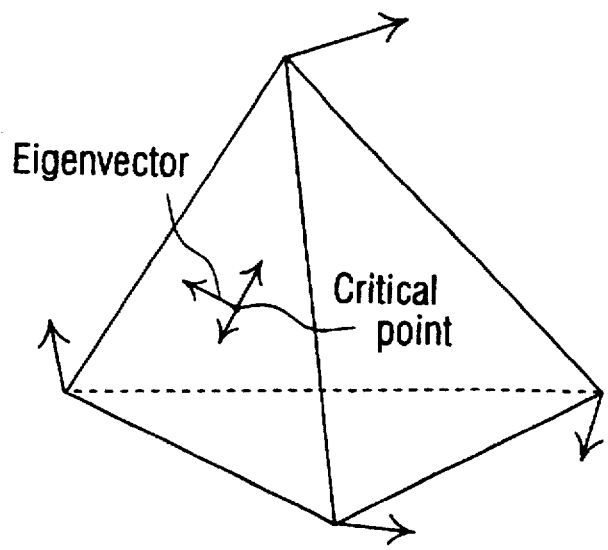
FIG. 5 depicts a tetrahedral cell having a critical point whose eigenvalue is positive.
Figure 6:
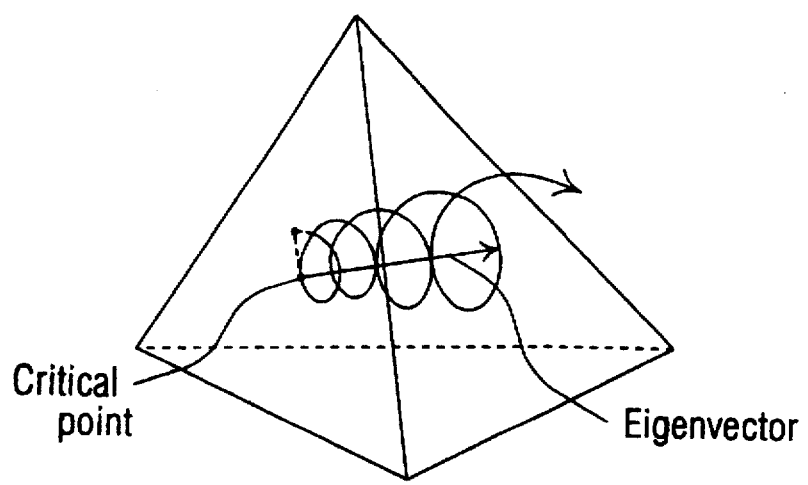
FIG. 6 illustrates a tetrahedral cell having a critical point whose eigenvalue is a complex number.
Figure 7:
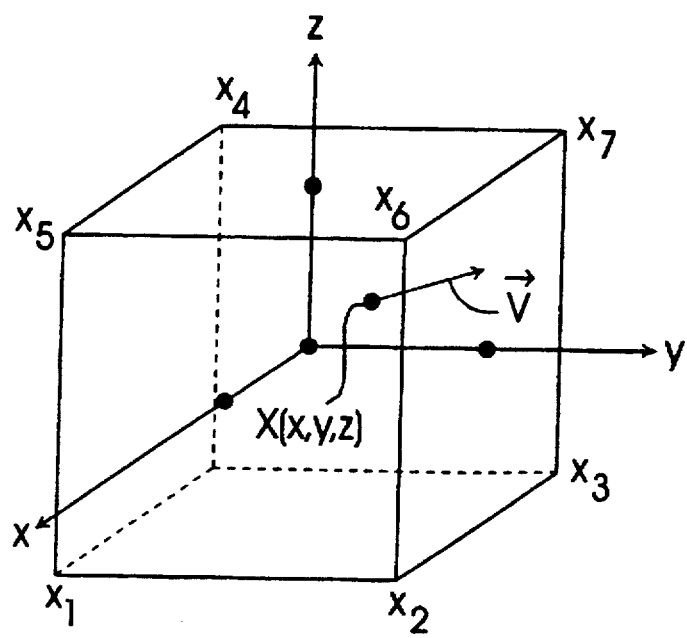
FIG. 7 shows an example of a prior art right-cross cell.

At the completion of step 27, the state of the stream line is identified according to the eigenvalues of the Jacobian matrix J. This identification is described by Helman and Hesselink in a paper titled "Visualizing Vector Field Topology in Fluid Flows," IEEE Computer Graphics and Applications, Vol. 11, No. 3, pp. 33–46. According to Helman et al., a positive eigenvalue corresponds to a velocity vector going away from a critical point (see FIG. 5), while a negative eigenvalue corresponds to a velocity vector going toward a critical point. In addition, in the case where an eigenvalue is a complex number, a velocity vector forms a vortex locally, as shown in FIG. 6. When such a state of a stream line is found and the stream line is drawn taking the critical point into consideration, the desired phenomenon can be displayed. Thus, if the goal is to display a vortex, the stream line is calculated and drawn only when the eigenvalue is a complex number. In the case where the user is interested in an attracting state, the stream line is drawn only when the eigenvalue is negative.

The eigenvalues comprise 3 eigenvalues and therefore three eigenvectors are obtained. However, in the case where an eigenvalue is a complex number, two eigenvalues are complex numbers and the remaining one is a real number. Drawing a stream line for each eigenvalue is arbitrary and depends on the state of the space that displays the stream line.

Where the eigenvalues and the eigenvectors are obtained according to the method described in the present invention, the stream line can be drawn using these values and vectors. However, the stream line can not be drawn from the critical point because the velocity vector at that point is equal to zero. For this reason, a point moved a microscopic distance from the critical point is regarded as the starting point. However, since the eigenvector is only effective within a tetrahedral cell, the amount of movement must be such that the eigenvector is not moved outside of the tetrahedral cell. Taking this movement into consideration, the starting point can be expressed by Equation (11) as follows:

$$\vec{P}_{seed} \supset \vec{P}_c + k \times M_x^{-1} \times \vec{V}_{eigenvector} \qquad \text{Equation (11)}$$

In Equation (11), a position vector $P_{seed}$ represents a starting point, a position vector $P_c$ represents a critical point, and a vector $V_{eigenvector}$ represents the eigenvector of the eigenvalue. If the value of k is adjusted so that each component of the position vector $P_{seed}$ has a value between 0 and 1, then there is no possibility that the eigenvector is moved outside of the tetrahedral cell. In the case where the eigenvalues include complex numbers, it is necessary to calculate the vector $V_{eigenvector}$ as a vector perpendicular to the remaining eigenvector which has a real number. This technique is employed to facilitate the display of the vortex formed by the velocity vector. Since the obtained starting point has been expressed by the volume coordinates, Equation 3 is employed when the starting point is transformed the global coordinate XYZ system. The described movement of the starting point is further illustrated by step 29 of the flowchart in FIG. 2.

Referring to step 31 of the flowchart in FIG. 2, after a starting point is obtained according to the method described above, the stream line for a locus whose weight and size are zero can be drawn. A method of drawing such locus is well known in the prior art and various products are in the market, so a description of such a method will not be given. In addition, in the case where a tetrahedral cell has several eigenvalues, or where there are several tetrahedral cells, each having a critical point, the user may choose to display one or all of the points. It is well known to those skilled in the art as to how to specify and display a target field and the type of phenomenon desired to be displayed. Since the case of the eigenvalue being negative indicates the case in which the velocity vector is drawn to the critical point and it is therefore difficult to display as is, a locus obtained when the case of the velocity vector being drawn to the critical point is inversely tracked is to be displayed as a stream line.

What is claimed is:

1. In a computer system having a display, a method for drawing vector data as a plurality of stream lines in a space on the display, the space being divided into a plurality of tetrahedral cells, for each one of the tetrahedral cells, the method comprising the steps of:
    collecting position data and vector data for each of vertexes of the tetrahedral cell;
    transforming the collected position data and vector data into volume coordinates using transformation matrices $M_x$ and $M_y$, respectively;
    calculating a critical point using the volume coordinates transformed from the collected position and vector data, the critical point being within the tetrahedral cell and having a zero velocity;
    calculating a Jacobian matrix J for the critical point based on the coordinate transformation matrices $M_x$ and $M_y$;
    calculating eigenvalues of said Jacobian matrix;
    calculating a starting point of a stream line for each of the eigenvalues, wherein the starting point is in the tetrahedral cell and is moved a microscopic distance from the critical point;
    calculating, for each starting point, the stream line from the starting point; and
    displaying for each starting point, the stream line on the display.

2. The method of drawing stream lines as set forth in claim 1, wherein the step of collecting said position and vector data is performed using a finite-element method analysis.

3. The method of drawing stream lines as set forth in claim 1, wherein the transformation matrices $M_x$ and $M_y$ are, respectively, $$\begin{bmatrix} x_0-x_3 & x_1-x_3 & x_2-x_3 \\ y_0-y_3 & y_1-y_3 & y_2-y_3 \\ z_0-z_3 & z_1-z_3 & z_2-z_3 \end{bmatrix} \text{ and } \begin{bmatrix} u_0-u_3 & u_1-u_3 & u_2-u_3 \\ v_0-v_3 & v_1-v_3 & v_2-v_3 \\ w_0-w_3 & w_1-w_3 & w_2-w_3 \end{bmatrix}$$

where $x_i$, $y_i$, and $z_i$ represent the coordinates of a vertex i and $u_i$, $v_i$, and $w_i$, represent the vector data of the vertex i.

4. The method of drawing stream lines as set forth in claim 1, wherein the step of displaying said stream line is performed only for a stream line corresponding to a predetermined value for one of the eigenvalues.

5. The method of drawing stream lines as set forth in claim 4, wherein said predetermined value of the eigenvalue is a complex number.

6. The method of drawing stream lines as set forth in claim 1, wherein the step of displaying said stream line includes selecting a desired point and displaying a stream line from said desired point on said display.

7. A computer system having a display for drawing vector data as a plurality of stream lines in a space on the display, the space being divided into a plurality of tetrahedral cells, the computer system comprising:
    means for collecting, for each one of the tetrahedral cells, position data and vector data for each vertex of the tetrahedral cell;
    means for transforming the collected position data and vector data into volume coordinates using transformation matrices $M_x$ and $M_y$, respectively;
    means for calculating, for each one of the tetrahedral cells, a critical point using the volume coordinates transformed from the collected position and vector data, the critical point being within the tetrahedral cell and having a zero velocity;
    means for calculating, for each one of the tetrahedral cells, a Jacobian matrix J for the critical point based on the coordinate transformation matrices $M_x$ and $M_y$;

means for calculating, for each one of the tetrahedral cells, eigenvalues of said Jacobian matrix;

means for calculating, for each one of the tetrahedral cells, a starting point of a stream line for each of the eigenvalues, wherein the starting points is in the tetrahedral cell and is moved a microscopic distance from the critical point;

means for calculating, for each one of the tetrahedral cells and for each starting point, the stream line from the starting point; and means for displaying, for each one of the tetrahedral cells and for each starting point, the stream line on the display.

8. The computer system as set forth in claim 7, wherein the means for collecting said position and vector data collects data using a finite-element method analysis.

9. The computer system as set forth in claim 7, wherein the transformation matrices $M_x$ and $M_y$ are, respectively, $$\begin{bmatrix} x_0-x_3 & x_1-x_3 & x_2-x_3 \\ y_0-y_3 & y_1-y_3 & y_2-y_3 \\ z_0-z_3 & z_1-z_3 & z_2-z_3 \end{bmatrix} \text{ and } \begin{bmatrix} u_0-u_3 & u_1-u_3 & u_2-u_3 \\ v_0-v_3 & v_1-v_3 & v_2-v_3 \\ w_0-w_3 & w_1-w_3 & w_2-w_3 \end{bmatrix}$$

where $x_i$, $y_i$, and $z_i$ represent the coordinates of a vertex i and $u_i$, $v_i$, and $w_i$ represent the vector data of the vertex i.

10. The computer system as set forth in claim 7, wherein the means for displaying said stream line displays only a stream line corresponding to a predetermined value for one of the eigenvalues.

11. The computer system as set forth in claim 10, wherein the predetermined value of the eigenvalue is a complex number.

12. The computer system as set forth in claim 7, wherein the means for displaying said stream line includes means for selecting a desired point and displaying a stream line from said desired point on said display.

13. A computer program product, for use with a computer system having a display, the computer program product comprising:

a recording medium;

means, recorded on the recording medium, for directing the computer system to draw vector data as a plurality of stream lines in a space on the display, the space being divided into a plurality of tetrahedral cells, the means for directing to draw including:

(a) means, recorded on the recording medium, for directing the computer system to collect, for each one of the tetrahedral cells, position data and vector data for each vertex of said tetrahedral cell;

(b) means, recorded on the recording medium, for transforming the collected position data and vector data into volume coordinates using transformation matrices $M_x$ and $M_y$, respectively;

(c) means, recorded on the recording medium, for directing the computer system to calculate, for each one of the tetrahedral cells, a critical point using the volume coordinates transformed from the collected position and vector data, the critical point being within the tetrahedral cell and having a zero velocity;

(d) means, recorded on the recording medium, for directing the computer system to calculate, for each one of the tetrahedral cells, a Jacobian matrix J for the critical point based on the coordinate transformation matrices $M_x$ and $M_y$;

(e) means, recorded on the recording medium, for directing the computer system to calculate, for each one of the tetrahedral cells, eigenvalues of said Jacobian matrix;

(f) means, recorded on the recording medium, for directing the computer system to calculate, for each one of the tetrahedral cells, a starting point of a stream line for each of the eigenvalues, wherein the starting point is in the tetrahedral cell and is moved a microscopic distance from the critical point;

(g) means, recorded on the recording medium, for directing the computer system to calculate for each one of the tetrahedral cells and for each starting point, the stream line from said starting point; and (h) means, recorded on the recording medium, for directing the computer system to display for each one of the tetrahedral cells and for each starting point, the stream line on the display.

14. The computer program product as set forth in claim 13, wherein the means for directing to collect said position and vector data includes means, recorded on the recording medium, for directing the computer system to collect said data by a finite-element method analysis.

15. The computer program product as set forth in claim 13, wherein the transformation matrices $M_x$ and $M_y$ are, respectively, $$\begin{bmatrix} x_0-x_3 & x_1-x_3 & x_2-x_3 \\ y_0-y_3 & y_1-y_3 & y_2-y_3 \\ z_0-z_3 & z_1-z_3 & z_2-z_3 \end{bmatrix} \text{ and } \begin{bmatrix} u_0-u_3 & u_1-u_3 & u_2-u_3 \\ v_0-v_3 & v_1-v_3 & v_2-v_3 \\ w_0-w_3 & w_1-w_3 & w_2-w_3 \end{bmatrix}$$

where $x_i$, $y_i$, and $z_i$ represent the coordinates of a vertex i and $u_i$, $v_i$, and $w_i$ represent the vector data of the vertex i.

16. The computer program product as set forth in claim 13, wherein the means for displaying said stream line includes means, recorded on the recording medium, for instructing the computer system to display only a stream line corresponding to a predetermined value for one of the eigenvalues.

17. The computer program product as set forth in claim 16, wherein the predetermined value of the eigenvalue is a complex number.

18. The computer program product as set forth in claim 13, wherein the means for displaying said stream line includes means, recorded on the recording medium, for instructing the computer system to select a desired point and display a stream line from said desired point on said display.

* * * * *